United States Patent [19]

Porth et al.

[11] Patent Number: 4,742,710

[45] Date of Patent: May 10, 1988

[54] ARRANGEMENT HAVING AN AIR-MASS METER FOR AN INTERNAL COMBUSTION ENGINE

[75] Inventors: Wolfgang Porth, Frankfurt am Main; Wolfgang Weibler; Eckhardt Kern, both of Hofheim; Thomas Hannewald, Griesheim; Reiner Weingartner, Hofheim, all of Fed. Rep. of Germany

[73] Assignee: VDO Adolf Schindling AG, Frankfurt am Main, Fed. Rep. of Germany

[21] Appl. No.: 926,376

[22] Filed: Oct. 31, 1986

[30] Foreign Application Priority Data

Nov. 2, 1985 [DE] Fed. Rep. of Germany ....... 3539015

[51] Int. Cl.$^4$ .............................................. G01M 19/00
[52] U.S. Cl. ................................................... 73/118.2
[58] Field of Search ..................... 73/118.1, 118.2, 204

[56] References Cited

U.S. PATENT DOCUMENTS

| 3,965,730 | 6/1976 | Innes | 73/110.2 |
|---|---|---|---|
| 4,299,121 | 11/1981 | Asayana et al. | 73/118.1 |
| 4,375,204 | 3/1983 | Yamamoto | 73/118.2 |
| 4,418,568 | 12/1983 | Surman | 73/204 |
| 4,445,368 | 5/1984 | Sumal | 73/204 |
| 4,446,824 | 5/1984 | Endo et al. | 73/118.1 |
| 4,457,169 | 7/1984 | Lauterbach et al. | 73/204 |
| 4,527,423 | 7/1985 | Sato et al. | 73/118.11 |

FOREIGN PATENT DOCUMENTS

| 0066716 | 5/1980 | Japan | 73/204 |
|---|---|---|---|
| 0075544 | 6/1980 | Japan | 73/118.2 |
| 0100720 | 6/1985 | Japan | 73/204 |

Primary Examiner—Stewart J. Levy
Assistant Examiner—Robert R. Raevis
Attorney, Agent, or Firm—Martin A. Farber

[57] ABSTRACT

In an arrangement having an air-mass meter for an internal combustion engine, the measurement place of the air-mass meter is arranged within a flow channel which substantially circularly surrounds a hollow space connected with an intake opening of the internal combustion engine, said hollow space adjoining the interior of an air filter. The hollow space and the interior are separated from each other by a division wall. The arrangement of the invention permits a compact structural shape and, due to its long flow channel, a high degree of precision of the measurement of the mass of air.

21 Claims, 2 Drawing Sheets

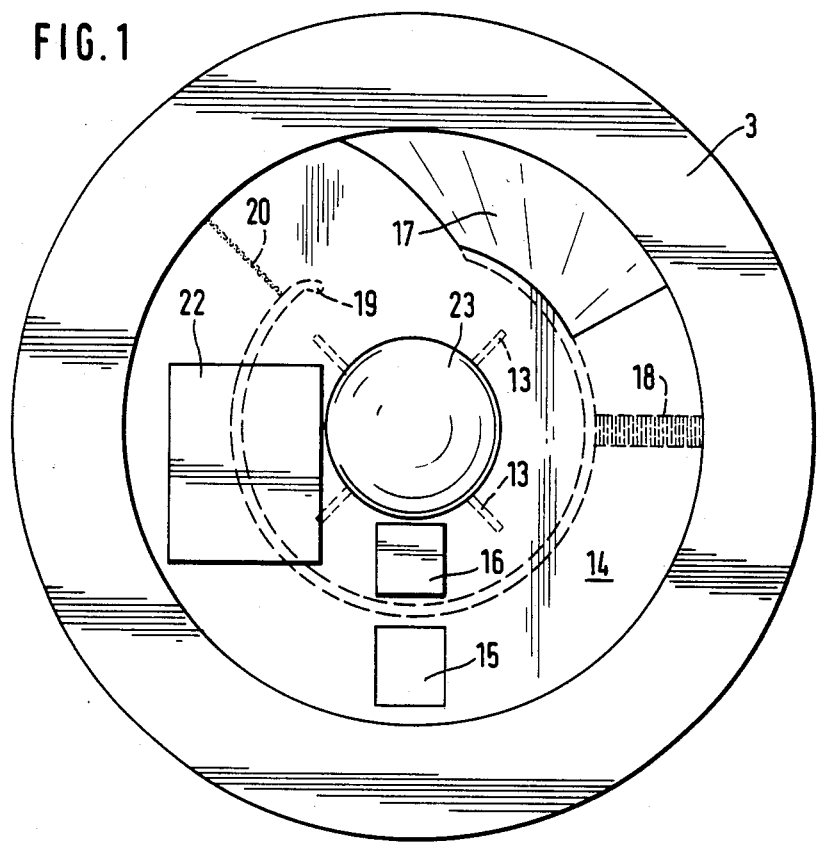
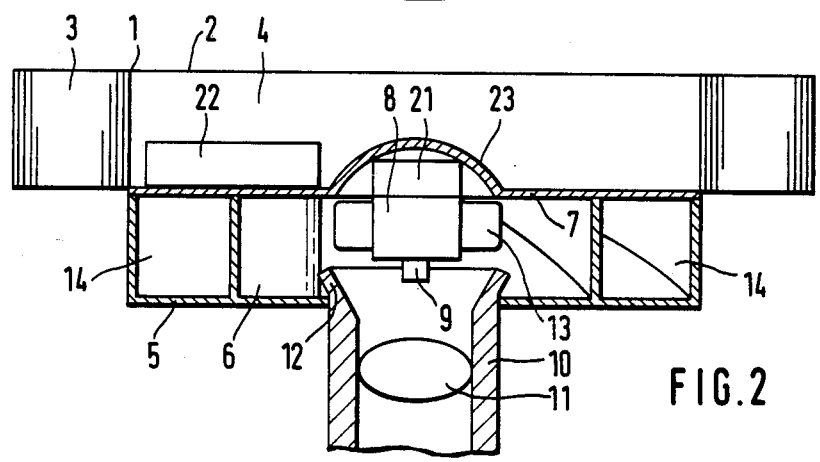

ARRANGEMENT HAVING AN AIR-MASS METER FOR AN INTERNAL COMBUSTION ENGINE

FIELD AND BACKGROUND OF THE INVENTION

The invention concerns a system having an air-mass meter for an internal combustion engine in which the measurement place of an air-mass meter is located in a measurement tube.

For the regulating of internal combustion engines with fuel injection, it is necessary to measure the mass of air drawn in by the engine. Mechanical systems for this purpose are known which operate, for instance, with movable flaps or aperture plates which extend into the stream of air. Sensors are also known, for instance hot-wire air-mass meters, for the measurement of the mass of air. They have the advantage that they have no moving parts, and interfere less with the flow of air than the mechanical systems do. Furthermore, the result of the measurement is independent of differences in altitude, which is not true of the mechanical systems, which primarily measure the quantity of air.

Various different methods have been employed for the arrangement of the air-mass or air-quantity meters. Thus it is known, for instance, structurally to connect an air-mass meter operating by ultrasonics to an air filter. In this case, the measurement place of the air-mass meter is arranged within a short measurement tube which is concentric to the air filter. Due to the short length of the measurement tube, however, conditions of air flow at the measurement place are suitable only within limits, the limitation of suitable air flow being found under different operating conditions with the same mass flow. Therefore the accuracy of the measurement does not meet all requirements.

It is therefore an object of the present arrangement to provide an arrangement with an air-mass meter in which suitable conditions of flow are assured within the measurement tube, so that more accurate measurement results are obtained. The arrangement having the air-mass meter should be economical to manufacture, operate reliably and be suitable with respect to the space required as well as its ease of maintenance, for installation on an internal combustion engine, particularly that of an automotive vehicle.

SUMMARY OF THE INVENTION

According to the invention, the measurement tube is developed as a substantially circular flow channel (14) and surrounds a hollow space (6) which is connected with an intake opening of the internal combustion engine, said hollow space (6) adjoining the interior (4) of an air filter (1) and the hollow space (6) and the interior (4) being separated from each other by a division wall (7).

By the arrangement in accordance with the invention, a sufficiently long flow channel and thus suitable conditions of flow at the place of measurement are assured. The arrangement of the invention is furthermore of a compact construction which takes up little space.

In accordance with a further development of the invention an opening which forms the inlet opening (17) of the flow channel (14) is provided in the division wall (7) the area of this opening being larger than the cross-sectional area of the flow channel (14).

In accordance with one embodiment of this further development, the flow channel (14) extends within the region of the inlet opening (17) in a plane which intersects the division wall (7) at an acute angle. Thus the prerequisites for suitable conditions of flow at the place of measurement are created already upon the entrance of the air into the flow channel.

Other developments reside in the fact that the flow channel (14) has a rectangular or round cross section and that the flow channel (14) is produced by suitably shaping a housing (5, 6) which surrounds the hollow space (6) and forms the division wall (7).

A particularly compact construction is obtained by the arrangement in the hollow space (6) of a fuel-injection valve (8) whose nozzle (9) faces a tube (10) which contains a throttle flap (11) and leads to the internal combustion engine.

In order to prevent parts of the injected mist of fuel from not coming directly into the intake channel of the engine but first passing into the hollow space the tube (10) which leads to the internal combustion engine can, in accordance with another feature, extend in funnel shape into the hollow space (6).

Further, within the region of the fuel-injection valve (8), the division wall (7) can have a bulge (23) which extends into the inner space of the air filter.

For the better conducting of the air within the hollow space, guide elements (13) can be arranged in the vicinity of the nozzle (9).

One advantageous further development of the arrangement according to the invention consists in the hollow space (6) being enclosed by a housing (5) on which the division wall (7) and the air filter (1) can be placed.

In order to be able to use compact air filters which have proven their suitability, the interior (4) of the air filter (1) and the hollow space (6) can each have the shape of a flat cylinder, in accordance with another embodiment of the invention.

Also, the fuel-injection valve (8) and the tube (10) can be arranged asymmetrically.

Further, the division wall (7) can be airtight.

Other features of the invention provide for a hydraulically favorable development of the flow channel, namely in the manner that the area of the inlet opening is greater than the cross-sectional area of the flow channel, that within the region of the inlet opening the flow channel extends in a plane which intersects the division wall at an acute angle and/or that the flow channel (14) contains a flow straightener (18) in the vicinity of its inlet opening (17) and a protective grid (20) in the vicinity of its outlet opening (19). Furthermore, in order to improve the flow in the vicinity of the sensor the diameter of the flow channel can be smaller at the place of measurement than at the inlet opening.

Further, the flow channel (14) can be developed as a Venturi nozzle within whose narrowest cross section the place of measurement (15) is provided.

Although the invention is primarily directed at the use of thermal sensors at the measurement point, for instance hot-wire sensors, the advantageous use of other sensors, for instance ultrasonic sensors, is entirely possible.

For the operation of the sensors in question, electric circuits are required, which are preferably arranged in the vicinity of the sensor. In accordance with further features of the invention, the electric circuit (16) associated with the sensor (15) is arranged in the vicinity of the sensor on the division wall (7). The necessary cooling of the electric circuit can be effected either by the filtered intake air or in the manner that the division wall serves as cooling member if—in accordance with another feature of the invention—the electric circuit (16) is in heat-conductive connection with the division wall (7).

Finally it is possible to arrange additional electric circuits (22) on the division wall (7) within the air filter, for instance a control circuit which evaluates the signals of the air-mass meter and possibly other sensors. In such case, in addition to the advantage of the cooling, there is also the further advantage that different elements which belong to a control system and thus functionally belong together are also physically arranged within one structural unit.

The invention permits of numerous embodiments.

BRIEF DESCRIPTION OF THE DRAWINGS

With the above and other objects and advantages in view, the present invention will become more clearly understood in connection with the detailed description of preferred embodiments when considered with the accompanying drawings, of which:

FIG. 1 is a plan view of an embodiment of the invention;

FIG. 2 is a longitudinal section through the first embodiment; and

Identical parts have been provided with the same reference numbers in the figures.

DETAILED DESCRIPTION OF THE PREFERRED EMBODIMENT

Figure 3:
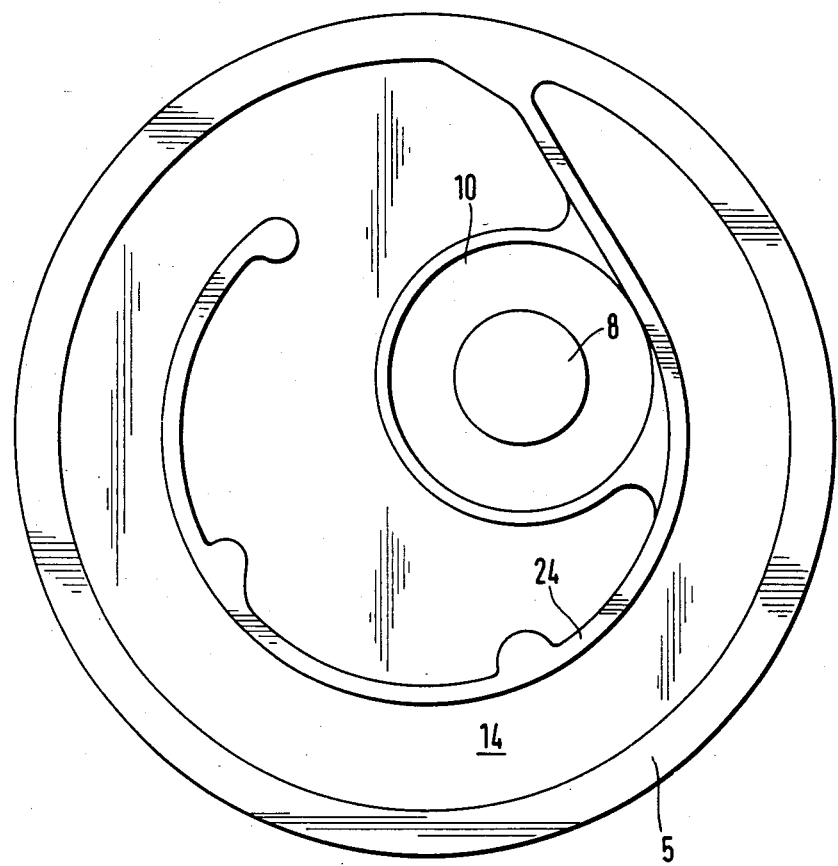
FIG. 3 is a cross section through the second embodiment.

The air filter 1 with a housing 2 is a known air filter having the shape of a flat cylinder, such as used in by far most gasoline engines. Instead of a pipe connection for the intake connection it is, however, open at the bottom. However, it is closed off by a division wall 7 which separates the interior 4 of the filter from the hollow space lying below it, which space will be described in further detail below. In the figure, the ring-shaped filter material 3 itself is shown merely diagrammatically.

The housing 5, which bears the air filter 1 and the division wall 7, is connected to a pipe 10 which forms the intake port of the internal combustion engine, not shown. The throttle valve 11 is arranged within the pipe 10. An injection valve 8, located above the inlet opening of the pipe 10, injects the fuel into the air which enters directly into the pipe 10. In order that a part of the particles of fuel sprayed by the nozzle 9 do not pass into the region of the air which does not flow directly into the pipe 10, a funnel-shaped widening 12 of the pipe 10 can be provided. Guide elements 13 contribute to streamlining the air flow in the space in front of the nozzle 9.

For the sake of clarity of the drawing a mounting for the injection valve within the housing 5 has not been shown. However, any man skilled in the art can design such a mounting.

The injection valve 8 can be combined as a single unit with a system pressure regulator 21, which is known per se. Conduits are provided for the feeding and return of the fuel, but they have not been shown in the drawing.

The hollow space 6 of the housing 5 forms a pulsation-damping space. As is known, in piston-type combustion engines the intake takes place in pulsating fashion. This pulsation makes itself noticeable throughout the entire intake system. For an accurate measurement of the mass of air, however, uniform flow is required within the air-mass meter; the pulsation therefore falsifies the result of the measurement.

The division wall 7 has an opening 17 which forms the inlet opening of the flow channel 14. Within the region of the inlet opening 17 the flow channel 14 extends at an acute angle to the plane of the division wall 7 so that the inlet opening 17 is large as compared with the cross section of the flow channel 14.

Near the outlet opening 19 there is provided a protective grid 20 while a flow straightener 18 is arranged at the inlet opening 17, it consisting in known manner of a plurality of channels formed in a block of material.

The flow channel 14 may be substantially circular (plan view of FIG. 1), and can have a smaller cross-sectional area in the region of the sensor 15 than elsewhere, the transitions taking place gradually. In order to avoid deposits of impurities on the sensor 15, a bar-shaped shield which is parallel to the sensor 15 can be arranged in known manner in front of the sensor 15 to protect the sensor 15.

As already stated above, different types of sensors can be used in the arrangement of the invention. One preferred type of sensor 15 consists of a thermal sensor in which a wire stretched out in the flow channel or a conductor arranged on an insulating board is traversed by current so that they definitely heat up to above the temperature of the air which flows past. By means of the temperature-dependent resistor,the temperature of the conductor can be brought to a constant value in an electric circuit 16, a larger or smaller current flowing through the conductor depending on the mass of air which flows past. In order to compensate for the influence of the temperature of the air, a comparison conductor can be arranged in the vicinity of the electrically heated measurement conductor. Only a small amount of current flows through the comparison conductor so that its temperature corresponds practically to the temperature of the air.

For the purpose of the electrical connections of the sensor 15 to the corresponding electric circuit 16, said circuit is arranged in the immediate vicinity of the sensor 15. In this connection it has proven particularly favorable to arrange the electric circuit 16 within the air filter and fasten it to the division wall 7. In such case, the air drawn in through the filter 1 serves for the cooling of the electric circuit 16, and, with good thermal contact between the circuit 16 and the division wall 17, the effective cooling surface for giving off heat to the air is substantially increased.

Aside from the electric circuit 16, there can also be provided in the interior 4 of the air filter 1 another circuit 22 which is connected to the circuit 16. The circuit 22 contains the known circuits necessary for electronic injection control. By the provision of the additional circuit 22 in this region on the division wall 7, not only is good cooling obtained but the laying of an electric line between the circuit 16 and the circuit 22 as well as the injection valve 8 is considerably simplified. Furthermore, it is favorable for purposes of maintenance for the said three components of the injection control system to be arranged within one structural group.

While in the embodiment shown in FIGS. 1 and 2, the pipe 10 and the injection valve 8 are arranged coaxially with the housing 5, in the embodiment of FIG. 3 there is an asymmetric arrangement of the injection valve 8 and of the pipe 10. In contrast to FIG. 1, FIG. 3 is a top view of the housing 5 with the division wall 7 removed. At various points on the inner limiting wall 24 of the flow channel 14, thickenings are provided to receive holes for the attachment of the division wall. Otherwise, the arrangement shown in FIG. 3 is such that the housing 5 together with the flow channel can be manufactured in one piece by injection molding.

We claim:

1. In a system having an air-mass meter for an internal combustion engine, in which system a place of measurement of the air-mass meter is located in a measurement tube, said system including a housing, a hollow portion of the housing defining a space which communicates with an intake opening of the internal combustion engine, said system including an air filter having an interior; the improvement wherein the measurement tube is formed as a substantially circular flow channel around a longitudinal axis of said intake opening, said flow channel extending in a plane normal to said axis and surrounding the space of said portion of the housing, thereby to reduce the height of said housing, said space adjoining said interior of said air filter; and wherein said system further comprises a division wall which separates said space and said interior of said air filter from each other, said housing and said division wall extending transversely to the longitudinal axis of said intake opening, said mesasurement tube lying outside of and substantially circumscribing said intake opening to provide an elongated passage for air between said filter and said space, the configuration of said measurement tube constraining air to flow parallel to said plane; and wherein said division wall forms therein an opening which forms an inlet opening of the flow channel, the area of said opening being larger than the cross-sectional area of said flow channel, there being an outlet opening of said flow channel communicating with said space.

2. The system according to claim 1, further comprising a flow straightener disposed in said flow channel in the vicinity of said inlet opening.

3. The system according to claim 1, wherein said flow channel has an outlet opening, said system further comprising a protective grid disposed in said flow channel in the vicinity of said outlet opening.

4. The system according to claim 1, wherein said flow channel is a Venturi nozzle having a constriction, said measurement place being at said constriction.

5. The system according to claim 1, wherein in the vicinity of said inlet opening, a part of said flow channel extends along a plane which intersects said division wall at an acute angle.

6. The system according to claim 1, wherein said flow channel has a rectangular cross section.

7. The system according to claim 1, wherein said flow channel has a round cross section.

8. The system according to claim 1, wherein said flow channel is formed by a suitably shaped portion of said housing which surrounds the hollow space and includes said division wall.

9. The system according to claim 1, further comprising a fuel-injection valve having a nozzle which is located in said hollow portion of the housing;
a further tube leading from the space of said hollow portion of the housing to the engine; and
a throttle valve disposed in said further tube, said nozzle facing said further tube.

10. The system according to claim 9, wherein said fuel injection valve and said further tube are arranged asymmetrically about a center line of said air filter.

11. The system according to claim 9, wherein said further tube projects in funnel shape into said hollow space.

12. The system according to claim 11, wherein within a vicinity of the fuel-injection valve, said division wall has a bulge, said bulge extending into the interior of the air filter.

13. The system according to claim 9, further comprising guide elements arranged in the vicinity of said nozzle.

14. The system according to claim 1, wherein said division wall and said air filter are supported by said housing.

15. The system according to claim 1, wherein the interior of said air filter and the hollow space each have the shape of a flat cylinder.

16. The system according to claim 1, wherein said division wall is airtight.

17. The system according to claim 1, further wherein said air-mass meter is a sensor located at said measurement place.

18. The system according to claim 17, wherein said sensor is a thermal sensor.

19. The system according to claim 17, further comprising an electric circuit operable with said sensor and located in the vicinity of said measurement place and on said division wall in the interior of said air filter.

20. The system according to claim 19, wherein said electric circuit is thermally coupled to said division wall.

21. The system according to claim 19, further comprising an additional electric circuit for electronic fuel injection of said engine, said additional circuit being located on said division wall in the interior of said air filter.

* * * * *